(12) United States Patent
Garvin

(10) Patent No.: US 6,886,161 B1
(45) Date of Patent: Apr. 26, 2005

(54) METHOD AND DATA STRUCTURE FOR COMPRESSING FILE-REFERENCE INFORMATION

(75) Inventor: Michael J. Garvin, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 636 days.

(21) Appl. No.: 09/863,319

(22) Filed: May 24, 2001

(51) Int. Cl.[7] .............................................. G06F 9/45
(52) U.S. Cl. ..................................................... 717/175
(58) Field of Search ................................ 717/175, 159

(56) References Cited

U.S. PATENT DOCUMENTS

| | | | |
|---|---|---|---|
| 4,626,829 A | | 12/1986 | Hauck ........................ 340/347 |
| 5,745,898 A | * | 4/1998 | Burrows ..................... 707/101 |
| 5,812,999 A | * | 9/1998 | Tateno ............................ 707/3 |
| 5,841,379 A | | 11/1998 | Seshan et al. ................. 341/63 |
| 5,893,102 A | * | 4/1999 | Maimone et al. ........... 707/101 |

OTHER PUBLICATIONS

Document: Phil Norman's Compression page: Switched RLE; downloaded from website inkvine.fluff.org/~forrey/compression/switchedrle.htm.

Technical Note TN 1023 "Understanding PackBits" Feb. 28, 2001.

Article: "RLE—Run Length Encoding", DataCompression Reference Center.

Document: Code Visualization and Documentation Tools "C–Vision for C++".

Document: COMPAQ fuse—Cross Referencer, Mar. 5, 2001.

* cited by examiner

*Primary Examiner*—John Chavis
(74) *Attorney, Agent, or Firm*—Max R. Wood; Ogilvy Renault

(57) ABSTRACT

Compression of local data uses various methods to encode location data (e.g. line numbers and, optionally, column numbers) representing references to a source code information symbol in a source code file. Run length encoding and other run encoding methods are used. A preferred run encoding method encodes a run-encoded bitmap comprising a set of runs, in which each run has a first run field that provides a starting line for the run, and a second run field that encodes as a bitmap the remaining lines in the run in which the reference appears. A run length field may be used to indicate the length of the second run field. Another run field may be used to encode the length of the first run field, to permit further compression.

23 Claims, 5 Drawing Sheets

METHOD AND DATA STRUCTURE FOR COMPRESSING FILE-REFERENCE INFORMATION

CROSS-REFERENCE TO RELATED APPLICATIONS

This is the first application filed for the present invention.

MICROFICHE APPENDIX

Not Applicable.

TECHNICAL FIELD

The present invention relates to computer program source code development, analysis and maintenance and, in particular, to the compression and storage of file-reference information.

BACKGROUND OF THE INVENTION

In many industries such as telecommunications, defense, aerospace and manufacturing, software applications have become increasingly large and complex. Applications can extend to many millions of lines of code. The code may be written by many developers compounding the difficulty of managing and understanding the applications. Navigating paper listings to understand program structure, file interdependencies, and the like is cumbersome and inefficient. As a result, sophisticated software engineering environments including integrated development environments (IDE) and source code analysis tools have been developed to aid developers in coping with the complexity.

One aspect of code visualization and navigation tools, sometimes referred to as source code browsing tools, is file-referencing. File references, like a book index, provide information about where in a collection of files and, preferably, how a source code identifier is referenced throughout the files. Source code identifiers comprise information symbols (names or tokens) assigned by programmers to variables, constants, functions, procedures, classes and other constructs and the like within the source code. The reference may classify the type of use, showing where the identifier is defined or declared, where its value is modified or otherwise referenced. At a more detailed level, the cross-reference system may pinpoint the relative location of the identifier in the file by line number and possibly column position.

Often, source code browsing tools present cross-reference information gleaned from a collection of files in a hierarchy of views. In a first level, identifiers may be presented while in a second or "Global" level, the files where the identifiers are referenced and the way the identifier is referenced in those files is illustrated. In a third or "Local" level, detailed information is presented to pinpoint the line and possibly the column where each reference to an identifier is made in a file. The partitioning of cross-reference information into global and local levels permits user queries to be performed at various levels of resolution, selecting more detailed views only when desired. This approach is important when browsing large scale systems because there may be thousands of files in which a given identifier is used. Presenting detailed information for all such files may overwhelm a user. Partitioning also aids in query performance.

File-reference information is typically gleaned by analyzing the source code, such as by parsing. For large applications, file-reference information poses storage and retrieval issues that must be addressed to ensure a suitable level of performance. Often a balance must be struck between storage conservation and run-time retrieval performance. Some source code tools use standard relational databases to store all "detailed" or local cross-reference information. However, these databases can grow very large and become difficult to manage. Response times for information retrieval can degenerate as the database grows. In addition, these large databases become costly to manage and store for systems that provide version control functionality.

Other file cross-referencing applications store less detailed or global file-reference information and, when additional information is needed for a given source code file, detailed information is reconstructed from the source code and summary information.

The retrieval of detailed information from a large database system or the construction of detailed information in a summary system may result in run-time performance delays that annoy users and contribute to software maintenance overhead.

It is therefore desirable to have a method and data structure for storing and accessing file-reference information that conserves storage space, and permits rapid responses to user information queries.

SUMMARY OF THE INVENTION

It is an object of the invention to provide a method, apparatus and data structure for compressing file-reference information.

The invention therefore provides a method of compressing file-reference data related to information symbols in a source file. The method comprises a first step of retrieving location data related to each location of respective ones of the information symbols in the source file. The location data is then compressed using a run encoding compression method to construct an encoded data structure. The compressed data structure is thereafter stored in a computer-readable storage medium.

The run encoding compression method comprises a step of encoding the location data in the encoded data structure as one or more runs. Each of the runs includes a first code for representing a first location of the information symbol in a section of the source file encoded by the run. If the information symbol occurs more than once in the section of the source file, a second code is used to represent one or more additional locations of the information symbol in the section of the source file.

The first code is preferably a binary number representative of a line number in the source file. The second code is preferably a binary string that serves as a bit map representing one or more additional lines offset from the line number in the source file in which the information symbol occurs at least once. Each run preferably has a variable length, and each run further comprises a third code for indicating a length of the second code. Each run optionally includes a fourth code indicating a length of the first code. This permits a further improvement in compression because it permits a shorter code to be used for source files that include relatively few lines, while a longer code is used to encode line numbers for large source files that include a large number of lines.

The source file is typically a source code file, and the information symbols are source code identifiers. The location data generally comprises a representation of one or more line numbers in the source code file on which a respective source code identifier is referenced. The location data may further comprise at least one representation of a column number for each line number represented in the location data and the at least one representation may also be stored in the computer-readable medium in association with the encoded data structure. The source code file is parsed to derive the file-reference data, and the step of retrieving comprises retrieving the location data from cross-reference line tables built during the step of parsing. The parsing may be accomplished using any parsing algorithm, including a fuzzy parsing algorithm for rapid generation of the location data.

The method may further comprise a step of compressing the information symbol into code having a predetermined length. If so, the code of predetermined length is preferably stored in the computer-readable medium in association with the respective encoded data structure. The data structure may be stored as a B-Tree, M-Tree, quad-tree or hashing-based structure, all of which are well known in the art.

The invention further provides a computer-readable medium containing a file-reference data structure, comprising one or more distinct information symbols and compressed file-reference data representing one or more locations of respective ones of the information symbols in a source file. The compressed file-reference data comprises run encoded location data generated by a run encoding compression algorithm. The encoded data structure field comprises one or more runs, each run including a first code for representing a first location of a reference in a section of the source file encoded by the run, and, if the reference occurs more than once in the source file, a second code comprising a bitmap representing one or more additional locations of the information symbol in the section of the source file. The run may further include a third code for indicating a length of the second code, and optionally a fourth code indicating a length of the first code.

The first code represents a line number in the source code file on which a respective information symbol is located. The second code is a binary bit map of additional lines on which the information symbol is located in the section of the source code. The third code indicates a length of the binary bit map.

The file-reference data may further comprise reference class data representing a use of the information symbol at a location of the reference, the file-reference data structure further comprising, for each of the information symbols and for each of the one or more locations to a reference, a reference class code field stored on the computer-readable medium in association with the respective encoded data structure, said reference class code field for storing reference class data encoded in a predetermined length reference class code.

The invention further provides an apparatus for compressing file-reference data related to information symbols in a source file. The apparatus comprises means for retrieving location data related to each location of respective ones of the information symbols in the source file; means for compressing the location data using a run encoding compression algorithm to construct an encoded data structure; and means for storing the encoded data structure in a computer-readable storage medium. The apparatus may further include a fuzzy parser algorithm for generating the location data related to each location of respective ones of the information symbols in the source file.

The run encoding compression algorithm is adapted to analyze the location data and construct at least one run associated with each information symbol, each run comprising at least a first code indicating a line number in the source file in which the information symbol appears. The run encoding compression algorithm is further adapted to examine the reference data and construct a binary string that serves as a bitmap offset from the first code to indicate a line location of additional occurrences of the information symbol in the source file. The run encoding compression algorithm is also adapted to determine a length of the run by computing a distance expressed in a total number of lines between a last occurrence of the information symbol in the run and a next occurrence of the information symbol in the source file. The next occurrence is included in the run if the distance is less than a predetermined threshold and an addition to the bitmap resulting from the inclusion does not make the run longer than a predetermined limit. The apparatus computes the predetermined threshold to a number of lines that would cause a length in bytes added to the bit map to exceed an overhead in bytes generated by creating a new run. The apparatus also determines the predetermined limit is by computing a capacity of a third code that indicates a length of the second code.

The method, apparatus and data structure of the present invention permit global and local file-reference information to be processed and stored in a more space efficient manner thus permitting tools for reviewing source code, such as browsing systems, editors or the like, to respond quickly to user queries at run-time. In addition, the compression algorithm permits fast decompression of the information further minimizing a user's perceived response delays.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
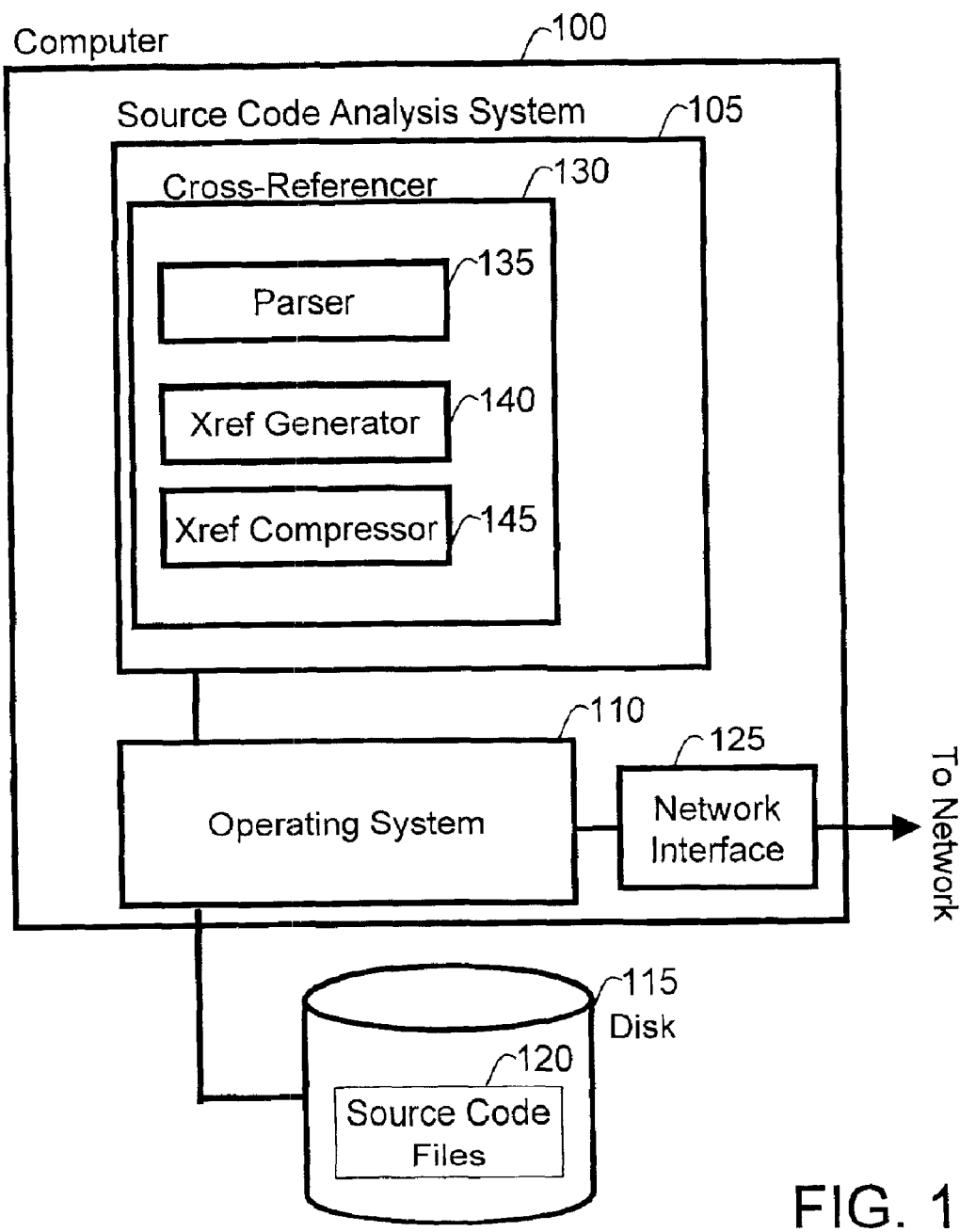
FIG. 1 is a schematic block diagram of a computer system including a cross-referencer within a source code analysis system in accordance with an embodiment of the present invention.

FIG. 1 is a schematic block diagram of a computer system including a cross referencer within a source code analysis system in accordance with an embodiment of the invention. As shown in FIG. 1, a source code analysis system 105 is provided within computer 100, which accesses and stores various files on a peripheral storage device (e.g. disk) 115 under control of an operating system 110. While source code analysis system 105 is shown within computer 100, source code analysis system 105 may be provided externally to computer 100 and accessed via a network. Source code analysis system 105 may be stored in a memory (not illustrated) of computer 100. Source code analysis system 105 typically analyzes source code files 120 stored on disk 115. Such source code files are typically related to applications under development. As well, source code analysis system 105 may access other source code files or working files generated by the analysis via network interface 125. Computer 100 and its operating system 110 may be a conventional personal computer, workstation or network station configured for application development.

One feature of source code analysis system 105 is cross-referencer 130 that provides the ability to obtain all references to a given source code identifier in one or more of source code files 120. It may further provide the ability to obtain all the identifiers that are referenced on any given line of source code in any of source code files 120. Cross-referencer 130 analyzes the source code via parser 135. Parser 135 parses the source code in accordance with rules governing the computer language in which the source code is written, ignoring comments and addressing preprocessor directives, and the like, to determine the identifiers and their respective types. While parser 135 is illustrated as part of cross-referencer 130, parser 135 may be shared with other features of the source code analysis system 105.

Cross-reference generator 140 generates global and local reference information for each identifier. A global reference for an identifier includes the file name in which the identifier occurs and a reference class indicating how the reference is used in the file. Reference classes include read, write and execute classes as well as others that indicate type definitions, class inheritance, etc. Cross-reference compressor 145 encodes and compresses the global and local reference information for, among other things, subsequent use in response to user queries.

In one embodiment of the invention, cross-reference compressor 145 codes 32 unique reference classes into 5 bits each. Rather than storing the file names or paths as strings, the paths are hashed by cross-reference compressor 145 to form unique integer values (i.e. code values of a predetermined length) using well known techniques. A global reference for a given identifier thus may comprise two 32 bit unsigned values comprising a file key and a bit set of reference classes. The bit set for each file contains a summary of how the identifier was used in the given file. No information about the number of occurrences of an identifier or the line number references is provided by a global reference, as this detail is left to a local reference. Such a formulation of global reference information is very compact even for very large source code applications. The data may be easily indexed for quick retrieval using an identifier to the files where it is referenced.

Cross-reference generator 140 further generates local cross references that preferably include three pieces of information: the identifier name (the sequence of characters composing the identifier), the position in the file, including the line number and optimally the column number, and the reference class indicating the way in which the identifier is used at that reference point. A collection of references to an identifier may be viewed as a set of paired references where each pair includes a line/column position, and a reference class. One approach to storing local cross-references is to simply write this data to a file on storage device 115 as pairs of integers. While such an approach may work, it consumes a great deal of storage space. By limiting the information that is stored as described below, immediate space savings are achieved using cross-reference compressor 145.

In accordance with one embodiment of the invention, local reference classes are coded as one of 16, rather than 32, values thus requiring only 4 bits to store the reference class for a given position. It is further assumed that a first instance of an identifier on a given line occurs at a column number less than 256 (where 1 is the first column at the left margin). Therefore, only 8 bits are required to encode the column information. Further, for each line only the column number for the first instance of a given identifier on that line is stored. If the same identifier occurs more than once on a given line, indicating the initial reference at the line is considered sufficient.

Each local reference may be coded into a 32 bit value leaving 20 bits (32–4–8) for a line number value. Using this encoding method, each unique identifier used in a given file has a set of 32 bit values representing the references in a file. Each value encodes the reference class, line number and first column position. Because only the column number for the first instance of the identifier on each line is stored, the column information can actually be represented separately. Each unique identifier may then have two associated ordered vectors: one vector is an ordered list of 8 bit values corresponding to the first column position in each line where the identifier is used, and the other vector is an ordered list of 24 bit values that encode the line number of each line where the identifier occurs, and the reference class of the first occurrence of the identifier at the respective lines.

In accordance with this coding method, the local cross references for a given file can be amended in a tabular form of identifier and the two vectors, followed by a next identifier and so on. While workable, this format can be further compressed. First, most source files are not long enough to require up to 20 bits to store line numbers. At the same time however, there are no standard file sizes for source code files, so an adaptive encoding method is preferred. Second, most identifiers are typically used in a few random places in a file rather than on many lines in a file. An encoding method may take advantage of the "sparse" nature of identifier occurrences. Third, column information isn't actually needed. It may be assumed that two identifiers with the same name, but having different types, almost never occur on the same line. Moreover, most lines of source code are not particularly long. Thus the column position is not critical for effective source code browsing. Determining and saving the column number may be eliminated with a minimum of risk to performance criteria. At most, only the reference class and the line information are required. To take advantage of these final assumptions, the column information is eliminated and run encoding of line information is performed to further compress local reference information as described below.

In accordance with a further embodiment of the invention, the line number and reference class information are separated into a vector of reference class codes and encoded runs of line information. The reference class vector comprises an ordered set of 4 bit reference codes indicating how the first occurrence of the given identifier is used in a line.

Rather than store the line number references as a set of line numbers, the references may be coded as positions in a bitmap, where an individual bit position represents a line number in a source code file. Such a notional bitmap has a maximum bit length equal to the number of lines of source code for a respective file. For example, an 8000 line file requires a 1000 byte bitmap. However, it is understood that a particular identifier will likely appear in only a relatively small subset of the lines of any file, and that such references are often clustered within a few successive or substantially adjacent lines in a few sections of the source code rather than being widely distributed throughout the code. It is apparent that such an encoded notional bitmap would include 64 long intervals that represent lines on which the identifier does not appear and small groups of bits that include the presence of the identifier.

For example, if identifier IS_COMPLEX appears in source code file difficult.c at lines 100, 150, 153, 160 and 200 a notional bitmap encoding references for the identifier may have equivalent bit positions set to 1 and the remaining positions set to 0. Large groups of 0's representing lines 1–99, 101–149, 161–199 and 201+ need not be stored, and thus the number of bytes required to store the notional bitmap can be reduced. It is therefore preferable to represent each notional bitmap using a method of run encoding that reduces the storage required for the groups of 0's.

Figure 2:
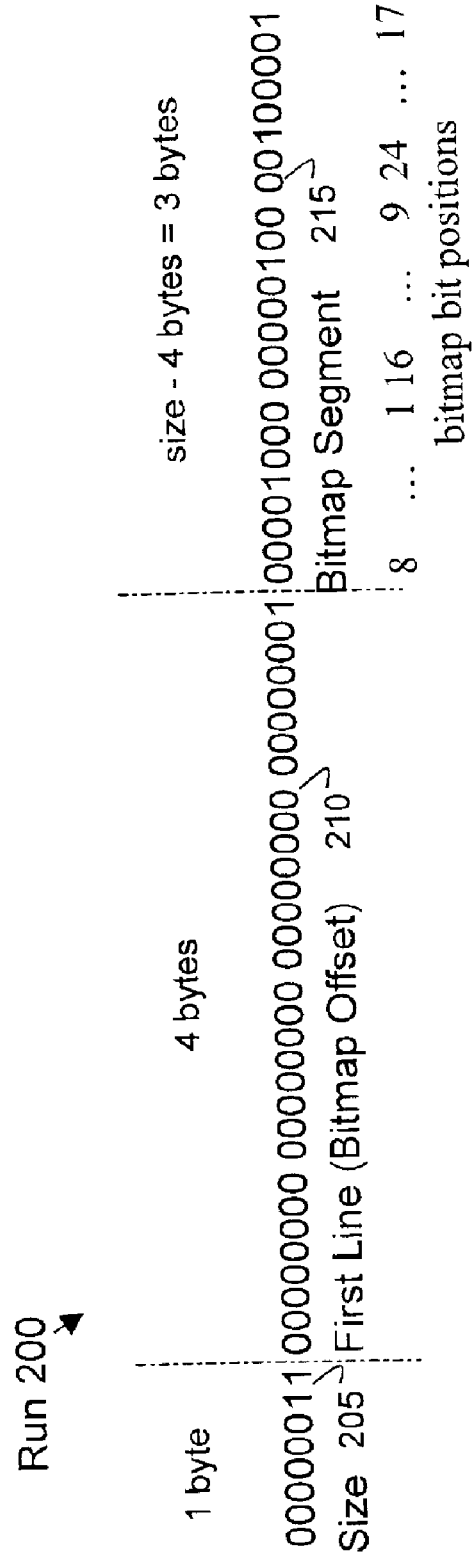
FIG. 2 is an exemplary run of a run encoding method for storing cross-reference information in accordance with an embodiment of the invention.

FIG. 2 illustrates an exemplary run encoding of a sparse bitmap that is equivalent to the notional bitmap. In brief, it is preferable to encode the bitmap as one or more runs of bitmap segments. Preferably, a run is represented by a binary string that is subdivided into three codes. A one-byte binary number (third code) indicates the number of bytes of bitmap representing lines of source code encoded by the present run. The next is a binary number (first code) that represents a first line number encoded by the run. If more than one line number is encoded in the run, a second code consisting of bits that provide a bitmap segment, equivalent to a portion of the notional bitmap. The bitmap segment indicates the lines that include references encoded in the run. The first line number (first code) in the run is used as an offset for the bitmap segment relative to the first line of code in a source file. Bit positions in the bitmap segment (second code) are used as offsets relative to the first line number binary "1" indicating line references in the run, and binary "0" indicating a line in the run in which the reference does not appear.

By way of example, a set of line reference numbers 1, 5, 12, 18, 23, 63, 64, 72 and 150 may be run encoded into three runs, namely (1, 5, 12, 18, 23) (63, 64, 72) and (150). FIG. 2 illustrates a run 200 in accordance with an embodiment of the invention, encoding the first run (1–23) of the example. Run 200 comprises a first byte (third code) representing a size 205 (in bytes) of run 200, a series of bytes (first code) representing a first line number 210 encoded by run 200 and a series of bits (second code) representing a bitmap segment 215 that indicates which of lines 1–23 include the reference. Size 205 is preferably a one byte binary number. First line number 210 is preferably at most 4 bytes in length. Bitmap segment 215 in this example is 3 bytes in length to encode the run between the first line number (line 1) in run 200 and the last line number (line 23), which is 23−1=22, requiring 3 bytes to encode. The value of size 205, namely binary 3, indicates the length in bytes of bitmap segment 215. Since size 205 is preferably only 1 byte in length, the size of any run is limited to 256 bytes, enabling a maximum bitmap segment run span of 2048 lines (i.e. 256 bytes of bitmap).

Bits 4, 11, 17 and 22 of bitmap segment 215 are set and represent offsets from the first line number of the run where the reference of interest is located. Modulo arithmetic can be used to easily map these bit positions to the bytes in the bitmap and a simple bit mask can be used to flip on the appropriate bit. The remaining runs of the example may be encoded similarly. It should be noted that the last run of one line number (line 150) does not require a bitmap segment. That run is therefore encoded as 00000000/00000000 00000000 00000000 10010110.

In the preferred run encoding method, the leading 5 bytes of a run are overhead. If a gap between two line numbers is less than 40 lines, then it is generally more efficient to store the next line number in a run than to start an additional run.

Provided any one individual source code file is no more than $2^{24}$ lines, the first line number 210 may be encoded in 3 bytes, in which case the threshold between runs drops to 32 lines and compression is further enhanced. In a further embodiment, a bit flag (fourth code) such as the most significant bit of size 205 (third code) or first line number 210 (first code) may be used as a flag to indicate whether first line number 210 is of a first or second length in bytes. For example if the most significant bit of size 205 is set, then first line number 210 may be 0.3 bytes in length and if it is not set, the length may be only to 2 bytes. It should be further understood that the length of each bitmap segment may be fixed, eliminating the requirement for a size byte.

The preferred encoding method results in substantial compression of line reference information. In the above example utilizing run encoding with a first line number (first code) encoded in 4 bytes, a total of 8 bytes are required to encode the first run, with 7 and 5 bytes respectively for the remaining two runs. A total of 20 bytes are thus required. If the 9 line number values are stored as 20 bit values as earlier proposed rather than run encoded, a total of at least 22 bytes are required. Besides, very long source code files of more than $2^{20}$ lines cannot be represented in that way. About a 10% compression of line number storage is therefore achieved. However, if the line numbers are encoded according to the preferred method whereby the first line number is stored with a flag indicating a 2 or 3 byte configuration for the first line number 210, then only 14 bytes are required, providing a 36% reduction.

Alternative compression encoding methods may also be employed while keeping within the scope of the invention. For example, common run length encoding (RLE) methods may be utilized to encode a compressed bitmap that is equivalent to the notional bitmap. One common method is PackBits by Apple Computer, Inc. as described in "Technical Note TN 1023 Understanding PackBits" February, 1996 (located at web address devworld.apple.com/technotes/tn/tn1023.html), which is incorporated herein by reference. Another method is Switched RLE purported to be authored by Phil Norman as described in Phil Norman's Compression Page—Switched RLE (located at web address inkvine.fluff.org/forrey/compression/switchedrle.html), which also is incorporated herein by reference. Such algorithms compress bitmaps or other data structures by replacing repeated data sequences, (e.g. long lengths of a bitmap where no reference is indicated) with encoded fill or repeat instructions.

Figure 3:
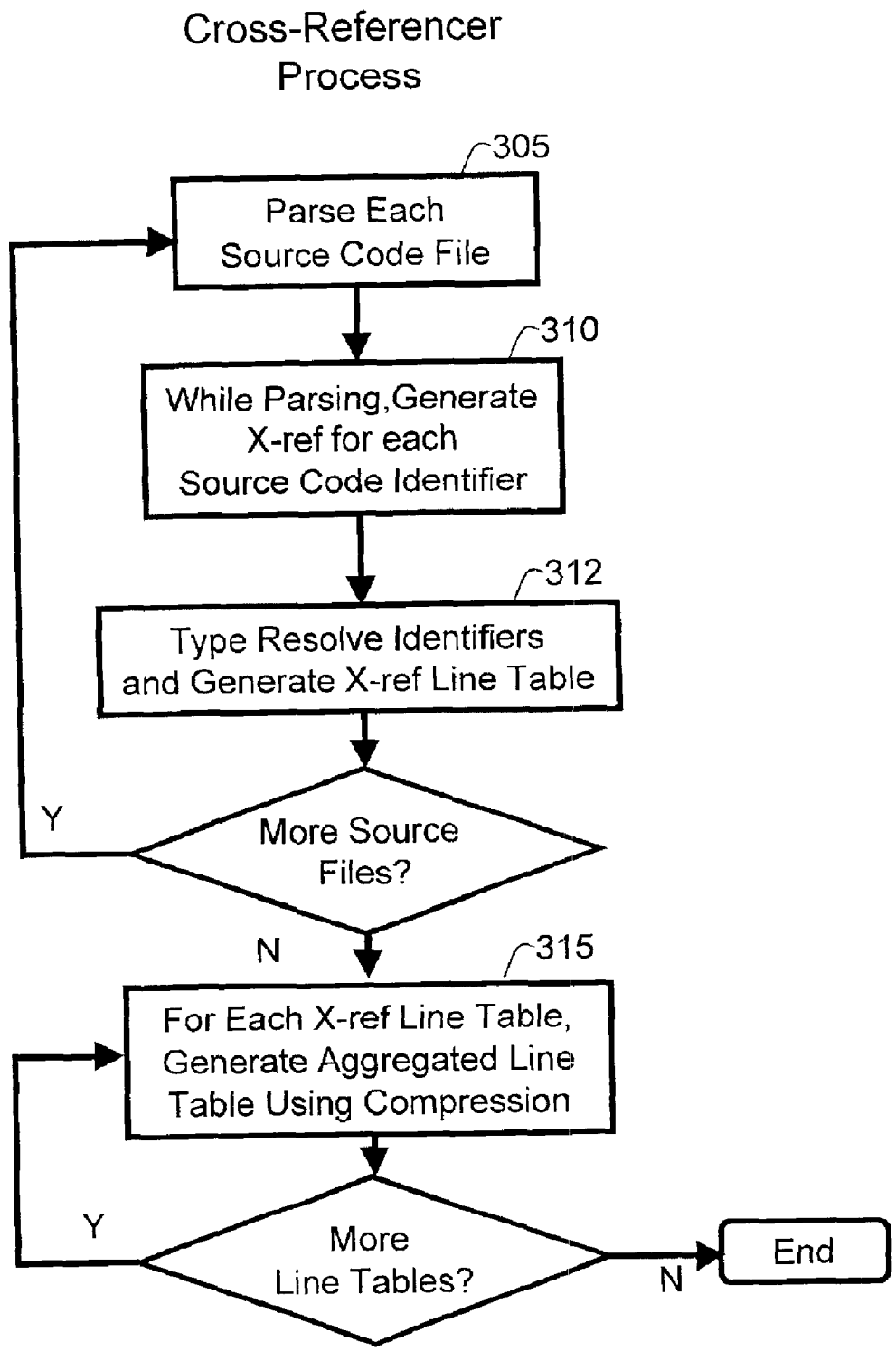
FIG. 3 is a flow diagram of the cross-reference generation process performed by a cross-referencer in accordance with the present invention.

FIG. 3 illustrates a general flow of an exemplary cross-reference generation process performed by the cross-referencer of the present invention. The process described with reference to FIG. 3 is performed by cross-referencer 130. Upon user identification of one or more source code files 120 (FIG. 1), cross-referencer 130 parses the source code files using the parser 135 (step 305). In order to extract detailed cross-reference information from the source code, it is preferable to analyze the code using parsing methods. Parsing may form part of a formal application build procedure wherein the source code is compiled or interpreted, as may be appropriate, with a view to the machine execution of the code. However, in accordance with the invention, the parse may be performed with less rigorous regard to the requirements of generating executable code and be more directed to generating analysis information such as cross-reference data, object class graphical hierarchies, function call relationships and other program visualization tool data. In such instances, the source code analysis may be less concerned with detecting, reporting and resolving errors.

Although not preferred, some cross-reference information may be obtained through simple scanning, with little reference to grammar-driven analysis. An exemplary method of parsing in this way is described in Applicant's co-pending U.S. patent application entitled "METHOD AND TECHNIQUE FOR APPROXIMATE GENERATION OF SOURCE CODE CROSS-REFERENCE INFORMATION", filed Jul. 11, 2002 under Ser. No. 10/192,596 and incorporated herein by reference.

As the parse of a source code file progresses, global line reference and local line reference information are generated for each source code identifier encountered (step 310) by cross-reference generator 140 (FIG. 1). In a parsing method in which a single pass is made through a source code file, it is not possible to type resolve all source code identifiers. Thus, some file-reference information generated does not have sufficient type and namespace information to uniquely describe the identifier encountered. Step 312 performs additional type resolution on the identifiers in the cross-reference information using the knowledge of the identifiers gleaned from the complete parse to clean-up any cross-references generated by the parser before the type information was determined. As per well-known parsing techniques, symbol tables may be constructed during parsing for each source file and any included files to manage the determination and type resolution of the identifiers. It is understood that some references may not be fully resolved and that full resolution may be sacrificed to shorten processing time.

After resolution of the identifiers and their respective types is completed, cross-reference generator 140 constructs a table of file-reference information related to the source code file in step 312.

In accordance with an embodiment of the invention, in order to increase processing efficiency, a hash table technique is employed to construct a line table or data storage mechanism for the local reference information for each file. A hash table with source code identifiers for keys and table values as sets of line numbers and sets of reference classes is used:

hashfunction(identifier)->{line number set}{reference class set}

As a local cross-reference for an identifier is determined, the identifier is used to look up a line number set and reference class set and the new reference data is appropriately added. When the end of a source code file is reached, the local line table as a whole for the file can be converted to a space efficient form and stored on disk storage.

In some computer languages, header files, which may contain method bodies, can appear in multiple files, which are processed together either as part of a full application parse or a selected parse. A particular line table may be used for a time while one file is processed, and then not used again for some time. Preferably, run-time memory allocated to line tables may be reused during the cross-reference generation process of multiple files. Specific line tables may be cached (i.e. written out to a storage device) in the interim using a second chance, first-in-first-out (FIFO) method.

In step 315, when the generation of the local line table is complete for all source code files of interest and the tables have been cached to disk, the caches may be retrieved to generate an aggregated line table for all the source code files analyzed. In accordance with the invention, the file-reference information in the local line tables is merged and compressed into a single collection, while maintaining retrieval indexing of the information by file to save space and provide effective run-time processing when providing the reference information in response to user queries.

Figure 4:
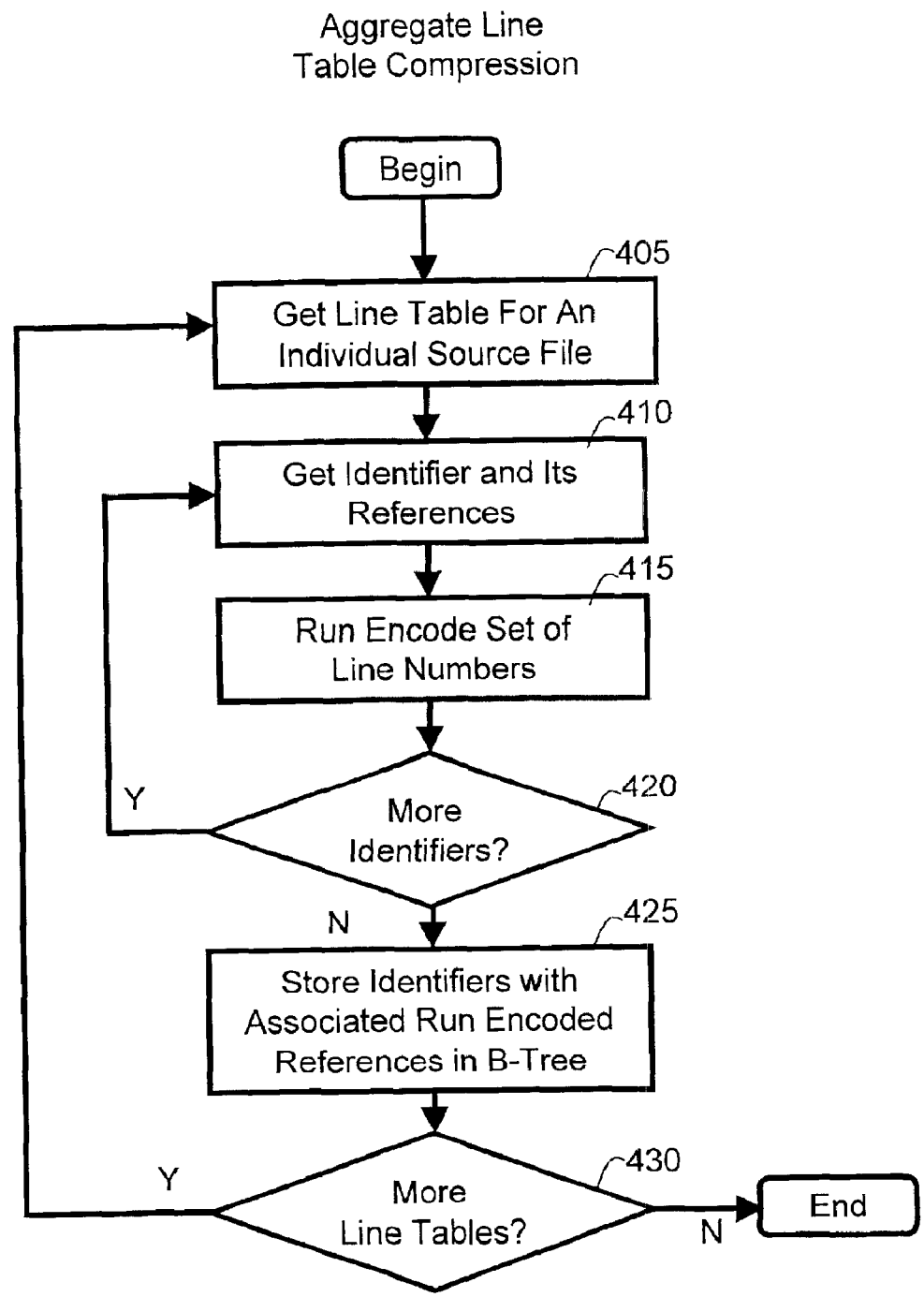
FIG. 4 is a flow diagram of the aggregated line table generating step shown in FIG. 3.

FIG. 4 is a flow diagram illustrating the aggregated line table generating step 315 shown in FIG. 3. An aggregated line table is constructed by reading each local line table cached to disk in step 405. For each source code file 120 (FIG. 1) selected by the user, the local line table generated in step 312 (FIG. 3) is read in from storage disk 115. The local line table is examined for each stored identifier in step 410. In step 415, the corresponding set of line number references for an identifier is compressed for efficient storage and decompression in response to a user request. The line number sets are compressed by run encoding as described above with reference to FIG. 2.

In step 420, if there are more identifiers in the current line table, control reverts back to step 410, and further references are read and line references are encoded. Otherwise, after all identifiers have been processed, the identifiers from the line table and all their respective associated run encoded reference sets are stored in step 425 in a manner that enables simple indexing by source code file. Because line-reference information naturally indexes to the specific source code file from which the reference information was generated, it is preferable to store the line reference information indexed by source file keys, such as in a B-Tree implementation well known in the computer field.

Figure 5:
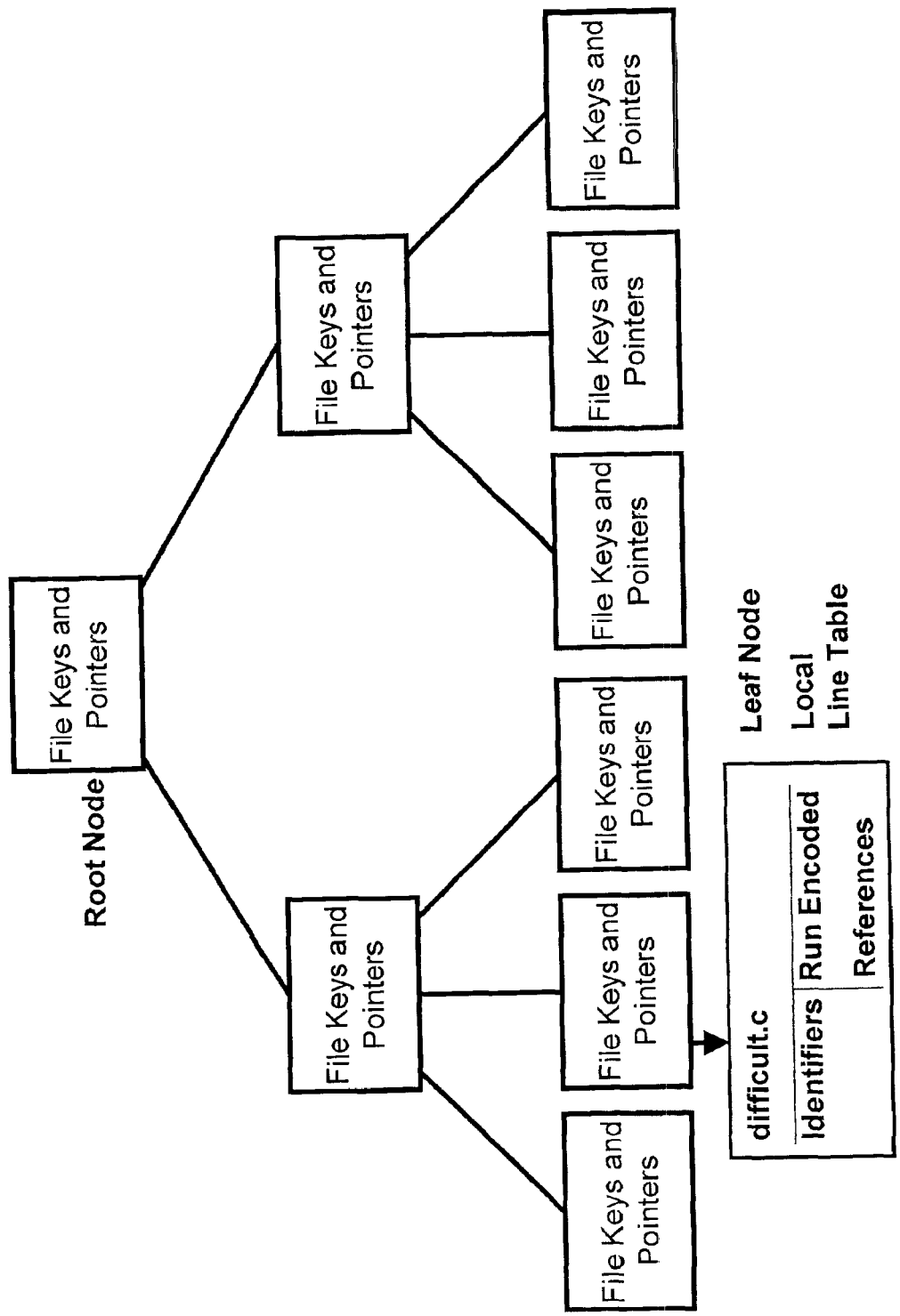
FIG. 5 is a schematic block diagram of a B-tree structure for storing line tables of source code identifiers and their respective run encoded cross-reference information indexed by source code file.

FIG. 5 is a diagram of an exemplary B-tree structure in which local cross-reference tables of run encoded cross-reference information and their respective associated source code identifiers are stored by cross-reference compressor 145 (FIG. 1) of the invention. Other data structures that provide quick access to line tables by source code file key may also be used. Such structures include multi-dimensional arrays, m-trees, quad-trees, hashing-based structures or the like.

Preferably, the index (B-tree, quad tree, etc), is used to map file keys (hashed values of file paths) to a pointer or offset value. The offset value is the location in a large, aggregated file where the local line table resides for a source file identified by the given file key.

In step 430 (FIG. 4), if there are more source code line tables to process, control reverts to step 405 for retrieval of another line table, until all tables are processed. Once all line tables are processed, the generated aggregated line table may be stored to disk 115 (FIG. 1) for later use (not shown).

In order to further improve storage efficiency, source code identifiers may also be compressed. Identifiers are used across multiple source code files and, as set out above, are stored in the B-Tree in association with each line table in which the identifier appears. Preferably, rather than store the actual identifiers in the indexed local line tables, each identifier may be replaced with a unique key that consumes a small and constant amount of space. Each identifier may be hashed to a 4 byte value, for example. Following construction of the aggregate line table after all global references are completed, identifiers in the aggregated line table may be replaced with a representation of the position (i.e. pointer or offset) of the identifier in the global cross-reference table.

A cross-reference query engine may be used to accept user queries and extract results from the global and aggregated local line tables. The aggregated line table provides a natural index of identifiers to their respective references in a source file. Users frequently wish to know what particular identifiers are referenced on any particular line in a source code file. Such a reverse index may be constructed from an aggregated line table stored in memory, but is preferably not permanently stored on disk 115 (FIG. 1).

To provide a rough bound for the size of local cross references in a given system where local line references are run encoded with a first line number of 4 bytes, the following calculations are used:

Identifiers can be hashed to 4 byte integer values.

Each identifier has an average of 10 references in a given file.

If each reference appears 40 lines after the last occurrence, and 40 lines before the next occurrence (worse case), a run encoded sparse bitmap implementation requires 50 bytes per identifier (10 references at 5 bytes each).

If there are about 100 identifiers per source code file, then the local cross references for one file require about 540 bytes.

In a system with 30,000 source files, there is a storage space requirement of about 16.2 Mb for cross-reference information.

If 3 byte values can be used to encode the first line in each run, space requirements are further reduced.

The embodiments of the invention described above are intended to be exemplary only. The scope of the invention is therefore intended to be limited solely by the scope of the appended claims.

I claim:

1. A method of compressing file-reference data related to information symbols in a source-file, comprising steps of:
   retrieving location data related to each location of respective ones of the information symbols in the source file;
   encoding the location data in the encoded data structure as one or more runs, each run including a first code for representing a line number of a first location of the information symbol in the source file encoded by the run, and, if the information symbol occurs more than once in the section of the source file, a second code providing a bit map representing one or more additional lines offset from the line number in the source file in which information symbol occurs at least once in the section of the source file;
   compressing the location data using a run encoding compression method to construct an encoded data structure; and
   storing the encoded data structure in a computer-readable storage medium.

2. The method as claimed in claim 1 wherein the first code is a binary number.

3. The method as claimed in claim 2 wherein the second code is a binary string that serves as the bit map.

4. The method as claimed in claim 3 wherein each run has a variable length, and each run further comprises a third code for indicating a length of the second code.

5. The method as claimed in claim 2 wherein each run further includes a fourth code indicating a length of the first code.

6. The method as claimed in claim 1 wherein the source file is a source code file, and the information symbols are source code identifiers.

7. The method as claimed in claim 6 wherein the location data comprises a representation of one or more line numbers in the source code file on which a respective information symbol is referenced.

8. The method of claim 7 wherein the location data further comprises at least one representation of a column number for each line number represented in the location data and the at least one representation is stored in the computer-readable medium in association with the encoded data structure.

9. The method as claimed in claim 1 further comprising a step of parsing the source file to derive the file-reference data, and the step of retrieving comprises retrieving the location data from cross reference line tables built during the step of parsing.

10. The method as claimed in claim 1 further comprising steps of:
    compressing the information symbol into a code having a predetermined length; and
    storing the code of predetermined length in the computer-readable medium in association with the respective encoded data structure.

11. The method as claimed in claim 1 wherein the data structure is a one of a B-tree, M-tree, quad-tree and hashing-based structure.

12. A computer-readable medium containing a file reference data structure, comprising one or more distinct information symbols and compressed file-reference data representing one or more locations of respective ones of the information symbols in a source file, the compressed file-reference data comprising run encoded location data generated by a run encoding compression method, encoded data structure comprising one or more runs, each run comprising a first code for representing a line number of a first location of an information symbol in a section of the source file encoded by the run, and, if the information symbol occurs more than once in the source file, a second code comprising a bitmap representing one or more additional locations of the information symbol in the section of the source file.

13. The computer-readable medium as claimed in claim 12 wherein the run further comprises a third code for indicating a length of the second code.

14. The computer-readable medium as claimed in claim 12 wherein the run further comprises a fourth code indicating a length of the first code.

15. The computer-readable medium as claimed in claim 12 wherein the source file is a source code file and wherein the information symbols are source code identifiers.

16. The computer-readable medium as claimed in claim 12 wherein the file-reference data further comprises reference class data representing a use of the information symbol at a location of the reference, the file-reference data structure further comprising, for each of the information symbols and for each of the one or more locations to a reference, a reference class code field stored on the computer-readable medium in association with the respective encoded data structure, said reference class code field storing reference class data encoded in a reference class code of a predetermined length.

17. The computer-readable medium as claimed in claim 16 wherein the location data represents one or more locations to a reference to the information symbol in one or more files of information symbols and wherein said locations are associated by file and wherein said file-reference data structure further comprises said first field and said encoded data structure field for each distinct file of information symbols.

18. The computer-readable medium as claimed in claim 12 wherein the index data structure is one of a B-Tree, M-Tree, quad-tree and hashing based structure.

19. An apparatus for compressing file-reference data related information symbols in a source file, comprising:
    means for retrieving location data related to each location of respective ones of the information symbols in the source file;
    means for compressing the location data using a run encoding compression algorithm to construct an encoded data structure, wherein the run encoding compression algorithm is adapted to analyze the location data and construct at least one run associated with each information symbol, each run comprising at least a first code indicating a line number in the source file in which the information symbol appears and a binary string that serves as a bitmap offset from the first code to indicate a line location of additional occurrences of the information symbol in the source file; and means for storing the encoded data structure in a computer-readable storage medium.

20. An apparatus as claimed in claim 19 further comprising a fuzzy parser for generating the location data related to each location of representative ones of the information symbols in the source file.

21. An apparatus as claimed in claim 19 wherein the run encoding compression algorithm is further adapted to determine a length of the run by computing a distance expressed in a total number of lines between a last occurrence of the information symbol in the run and a next occurrence of the information symbol in the source file, and to include the next occurrence in the run if the distance is less than a predetermined threshold and an addition to the bitmap resulting from the inclusion does not make the run longer than a predetermined limit.

22. An apparatus as claimed in claim 21 wherein the apparatus is further adapted to set the predetermined threshold to a number of lines that would cause a length in bytes added to the bit map to exceed an overhead in bytes generated by creating a new run.

23. An apparatus as claimed in claim 21 wherein the apparatus is further adapted to compute the predetermined limit is by computing a capacity of a third code that indicates a length of the second code.

* * * * *